UNITED STATES PATENT OFFICE.

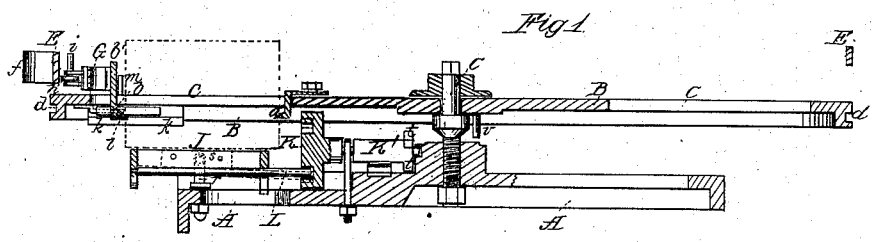
A. H. Clark,
Sawing Shingles,
Nº 32,467. Patented June 4, 1861.
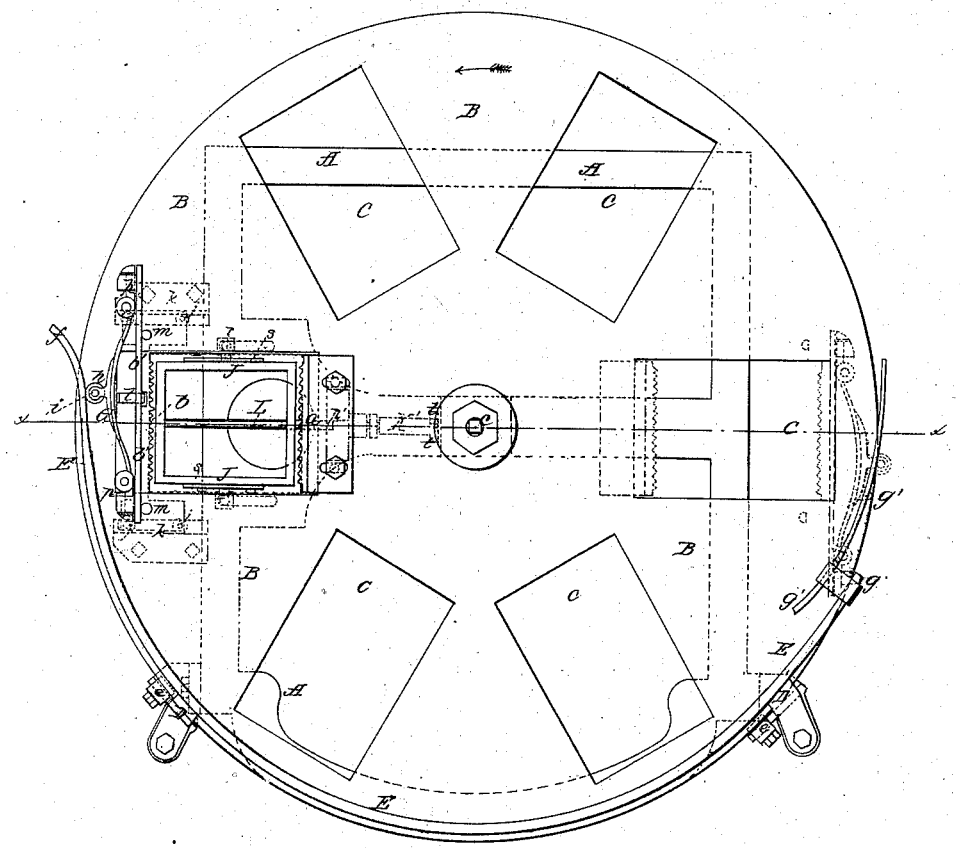
Witnesses
J. W. Coombs
R. S. Spencer
Inventor
A. H. Clark
by Munn & Co
Attys

A. H. CLARK, OF FOND DU LAC, WISCONSIN.

SHINGLE-MACHINE.

Specification of Letters Patent No. 32,467, dated June 4, 1861.

*To all whom it may concern:*

Be it known that I, A. H. CLARK, of Fond du Lac, in the county of Fond du Lac and State of Wisconsin, have invented certain new and useful Improvements in Shingle-Machines; and I do hereby declare that the following is a full, clear, and exact description thereof, reference being had to the accompanying drawings, making a part of this specification, in which—

Figure 1 is a cross section through part of a shingle machine, taken in the vertical plane indicated by the red line $x$, $x$, in Fig. 2. Fig. 2 is a plan view of the revolving belt carrying table and the bed on which it rests.

Similar letters of reference indicate corresponding parts in both figures.

This invention relates to certain novel improvements on shingle machines which were patented by Kasson Freeman, for obtaining a more perfect and expeditious mode of shifting the bolt to effect the taper of the shingles, and of gripping and releasing the bolt from which the shingles are sawed.

The nature of my invention and improvements in the aforesaid patent consist, firstly, in applying springs to the backs of the outer or movable dogs which are operated by a concentric curved bar to grip and release the bolts, said springs being so arranged on said dogs, that they will yield and properly grip bolts which slightly vary in length or whose ends are not exactly straight, as well as bolts which have their ends cut off square, all as will be hereinafter explained. Secondly, in forming a groove in the periphery of the horizontal bolt table and in using stationary guides which fit into this groove, and keep the table in a steady horizontal position as will be hereinafter described.

A. is the bed frame of the machine and B. is the circular revolving table having in it the bolt holes or spaces C. C. C. C. within which the bolts from which the shingles are sawed, are clamped between serrated jaws or dogs $a$, $b$.

The table B. revolves around a central arbor $c$, to which this table is properly attached. Around the circumference or periphery of the circular table B. a deep groove $d$, is formed into which groove the stationary guide pieces $e$, $e$, fit and keep the table from wabbling and in a true horizontal position. These guides are secured in a suitable manner to the bed A. of the machine. D. D. are stationary brackets to which the curved holding bar E. is secured. This bar is curved concentric with the axis of the table B. excepting its ends which are curved slightly outward as will be further explained. The bar E. is held by the brackets D. D. slightly over the edge of the table B. and the brackets keep the bar in a rigid position while the table B. revolves under it. The end $f$, of stationary holding bar E. is curved outward and to the opposite end a bracket $g$, is bolted which carries a curved releasing plate or spring $g'$, one end of which is bent inward and the opposite end, that farthest from the end of bar E., is bent outward.

On the inner edge of each of the spaces C. through table B. a toothed dog $a$, is bolted, the toothed edge of which projects down below the bottom of the table B. and is turned outward or toward the circumference of table B. This dog (I will only describe one as the dogs in all of the spaces C. C. C. are formed and applied alike) is securely bolted to the table B. the bolts of which may pass through transverse slots in the dog for allowing it to be adjusted in a direction with the length of the space C. Directly opposite to fixed dog $a$, is arranged a sliding dog $b$, which is in the same horizontal plane as dog $a$. To this dog $b$, a bar or plate $b'$, is secured the ends of which project out over the top surface of table B. a short distance, as shown in Fig. 1, of the drawings, and to the back of this cross bar $b'$, is attached a semi-elliptic spring G, carrying on its back surface a friction roller $h$, the vertical pivot or axis $i$, of which projects up such a distance that it will come in contact with the back, or outer side of the curved releasing arm $g'$, as the table is revolved, and the friction roller $h$, is so arranged that it will bear against the inside surface of curved bar E. as the table revolves. The ends of dog plate $b$, project out and carry on their ends friction rollers $j$, $j$, as shown in dotted lines Fig. 2, of the drawings and the rollers $j$, $j$, together with the projecting ends of the dog plate $b$, work in grooved guides $k$, $k$, secured to the bottom of the table B. at right angles to the dog $b$. The stationary arm $l$, which projects through the dog plate $b$, when it is released from the bolt is used to allow this dog $b$, to be withdrawn from the bolt easily by pushing the bolt off from the dog as this dog is moved back. The two pins $m$, $m$, projecting up from the surface of table B. on each side of the space C. are used merely to prevent the dog $b$, from being pushed out of its guides $k$, $k$.

The ends of spring G. are pivoted to two sliding pieces $p$, $p$ which are kept in place by guards secured to the back of bar $b'$. This arrangement allows the ends of the spring G. to expand or contract. This spring G. should be made very strong, and at the same time it should be allowed a free play, as will be hereinafter seen.

J. is a tilting bed which gives the inclination to the bolts so that they may be presented to the saw in a proper manner. This bed J. is situated under table B. and diametrically opposite to the end of bar E. which carries the releasing plate $g'$. Bed J. is of a rectangular shape and it is pivoted by arms $r$, $r$, which project up from and which are secured to the bed A. The pivot ends of arms pass into adjustable plates $s$, $s$, on each side of the tilting bed J. as shown in Fig. 2, so that by loosening the screws which secure plates $s$, $s$, to this bed J. it may be adjusted so as to tilt more or less according to the degree of taper it is desired to give the shingles. A wheel K. having an elliptical groove in its surface is used to give the tilting motion to bed J., and one end of a rod L. which passes through the bed J. works in the groove in wheel K. as shown in Fig. 1 of the drawings. Fig. 3 shows the groove in wheel K. The wheel K. is keyed to a square shaft K'. carrying four projections $t, t, t, t$, on its end near the arbor $c$, of table B. which projections are alternately struck by a projecting pin $v$, on the table B. as this table revolves which operation turns the wheel and shaft K. K'. one quarter revolution, so that the table is alternately moved from a horizontal position to an inclined position and vice versa as the table B. is revolved.

The operation of my improvements is as follows: The saw which cuts off the shingles from the bolts and the "fender" for supporting the bolts when they are released from the dogs $a$, $b$, and the mechanism for rotating the table B. are not represented in the drawings as these parts have been fully explained in the specification of the patent aforesaid of which my invention is an improvement. In a complete machine all the bolt spaces C. C. in table B. will be furnished with dogs which will be constructed so as to operate as those herein described for one space. Motion is communicated to table B. and this table is revolved around its central axis $c$, in the direction indicated by the arrows in Fig. 2, of the drawings. The bolts are put into the spaces C. and they successively pass over the tilting bed J. and as the table revolves the friction roller $h$, comes in contact with the curved end of bar E. which forces the dog $b$, inward and clamps the bolt securely between it and the opposite fixed dog $a$, before the bolt leaves the bed J. The semicircular bar E. will now keep the bolts well secured between the dogs $a$, and $b$, by preventing dog $b$, from springing outward, until the bolts pass the saw which cuts off a shingle each time, these, when the bolts pass the opposite end of bar E., the pivots $i$, projecting up from friction rollers $h$, on springs G. will pass behind the plate $g'$, which will force out the dog $b$, and allow the bolts to drop on a fender which is in the same plane as the tilting bed J. and which is carried around one side of the machine. On this table the bolts are each carried around and brought again on the tilting bed J. which adjusts them; and the dogs $b$, are again forced up to the bolts by the bar E. which holds them as before described until they pass the saw. In this way the bolts are each carried around and presented to the saw and grasped and released or what is commonly termed dogged and undogged until they are entirely cut up into shingles. During this operation and before the bolts are carried on the bed J. the pins $v$, projecting from the bottom of table B. strike the projecting teeth on shaft K'. and turn the wheel K. which gives the proper inclination to each bolt before it is "dogged." The springs G. interposed between the friction roller and dog plate $b'$, will yield and allow the dog $b$, to be firmly clamped to shingle bolts, which vary slightly in their length, and also to bolts whose ends are not cut off exactly square. The springs G. will also keep the friction rollers $h$, out against the surface of curved bar E. the full length of this bar and thus the pins $i$, will pass behind the releasing plates $g$, with greater certainty.

Having thus described my invention what I claim as new and desire to secure by Letters Patent is—

1. The spring G. with its friction roller $h$, and pin $i$, in combination with the sliding dog $b$, and curved holding bar E. substantially as and for the purposes herein described.

2. The stationary guides $e$, $e$, working in the groove $d$, in table B. substantially as described for keeping the table in a steady position.

3. Combining with bed J. pivoted as described, the slotted wheel or cam K. rod L. square shaft K'. having cogs $t$, $t$, on its end which are struck by the pins $v$, on the table B. for tilting said bed as and for the purposes herein described.

A. H. CLARK.

Witnesses:
O. E. WILKINS,
C. W. PINKHAM.